US011499448B2

(12) United States Patent
Yadav et al.

(10) Patent No.: US 11,499,448 B2
(45) Date of Patent: Nov. 15, 2022

(54) COMPOSITE FAN CONTAINMENT CASE

(71) Applicant: General Electric Company, Schenectady, NY (US)

(72) Inventors: Abhijeet Jayshingrao Yadav, Karad (IN); Nagamohan Govinahalli Prabhakar, Bangalore (IN); Nicholas Joseph Kray, Mason, OH (US); Shivam Mittal, Bangalore (IN); Praveen Sharma, Bangalore (IN); Bhujabal Prashant Mahadeo, Bangalore (IN); Ravindra Shankar Ganiger, Bangalore (IN)

(73) Assignee: General Electric Company, Schenectady, NY (US)

( * ) Notice: Subject to any disclaimer, the term of this patent is extended or adjusted under 35 U.S.C. 154(b) by 327 days.

(21) Appl. No.: 16/424,843

(22) Filed: May 29, 2019

(65) Prior Publication Data
US 2020/0378273 A1 Dec. 3, 2020

(51) Int. Cl.
*F01D 25/24* (2006.01)
*F01D 25/00* (2006.01)
*F02K 3/06* (2006.01)
*F03G 7/06* (2006.01)

(52) U.S. Cl.
CPC .......... *F01D 25/24* (2013.01); *F01D 25/005* (2013.01); *F02K 3/06* (2013.01); *F03G 7/065* (2013.01); *F05D 2220/323* (2013.01); *F05D 2240/14* (2013.01); *F05D 2300/174* (2013.01); *F05D 2300/1723* (2013.01); *F05D 2300/44* (2013.01); *F05D 2300/501* (2013.01); *F05D 2300/614* (2013.01); *F05D 2300/701* (2013.01)

(58) Field of Classification Search
CPC ........ F01D 25/24; F01D 25/28; F01D 21/045; F05D 2300/44; F05D 2300/10; F05D 2300/505
See application file for complete search history.

(56) References Cited

U.S. PATENT DOCUMENTS

| 5,516,257 A | 5/1996 | Kasprow et al. |
| 6,394,746 B1 | 5/2002 | Sathianathan et al. |
| 6,543,991 B2 | 4/2003 | Sathianathan et al. |
| 6,588,709 B1 * | 7/2003 | Dunne ................. F02C 7/042 |
| | | 16/225 |
| 6,769,864 B2 | 8/2004 | Sathianathan et al. |

(Continued)

OTHER PUBLICATIONS

Craftech Industries, "A beginner's guide to fiber reinforced plastics (frp's)" <https://web.archive.org/web/20170627050904/https://www.craftechind.com/beginners-guide-fiber-reinforced-plastics-frps/> (Year: 2017).*

*Primary Examiner* — Todd E Manahan
*Assistant Examiner* — Thuyhang N Nguyen
(74) *Attorney, Agent, or Firm* — Dority & Manning, P.A.

(57) ABSTRACT

A composite fan casing for a gas turbine engine defining a central axis is generally provided. The composite fan casing includes a core having a plurality of core layers of reinforcing fibers bonded together with a thermosetting polymeric resin and having an outer surface. The composite fan casing further includes at least one stiffener integrally coupled to an aft portion of the outer surface of the core relative to the central axis. Additionally, the at least one stiffener comprises an elastic material.

20 Claims, 10 Drawing Sheets

(56) References Cited

U.S. PATENT DOCUMENTS

| | | | | |
|---|---|---|---|---|
| 7,246,990 B2* | 7/2007 | Xie | ............ | F01D 25/24 |
| | | | | 415/173.4 |
| 7,517,184 B2* | 4/2009 | Costa | ............ | D03D 1/0052 |
| | | | | 415/1 |
| 8,043,045 B2* | 10/2011 | Clark | ............ | F01D 17/16 |
| | | | | 415/48 |
| 8,317,456 B2 | 11/2012 | Cardarella, Jr. | | |
| 8,425,178 B2 | 4/2013 | Lenk | | |
| 8,435,003 B2* | 5/2013 | Read | ............ | F04D 29/324 |
| | | | | 416/95 |
| 8,827,629 B2 | 9/2014 | Voleti et al. | | |
| 9,482,111 B2 | 11/2016 | Costa et al. | | |
| 9,833,930 B2 | 12/2017 | Goering | | |
| 10,352,173 B2* | 7/2019 | Prince | ............ | B29C 35/02 |
| 2007/0081887 A1 | 4/2007 | Xie et al. | | |
| 2012/0251305 A1* | 10/2012 | McMillan | ............ | F01D 5/28 |
| | | | | 415/182.1 |
| 2016/0032776 A1 | 2/2016 | Voleti et al. | | |
| 2016/0341070 A1* | 11/2016 | Garcia | ............ | F01D 21/04 |
| 2017/0198714 A1* | 7/2017 | Lin | ............ | B32B 5/245 |
| 2018/0056547 A1 | 3/2018 | Goering | | |
| 2018/0100519 A1* | 4/2018 | Klaassen | ............ | F04D 29/522 |

* cited by examiner

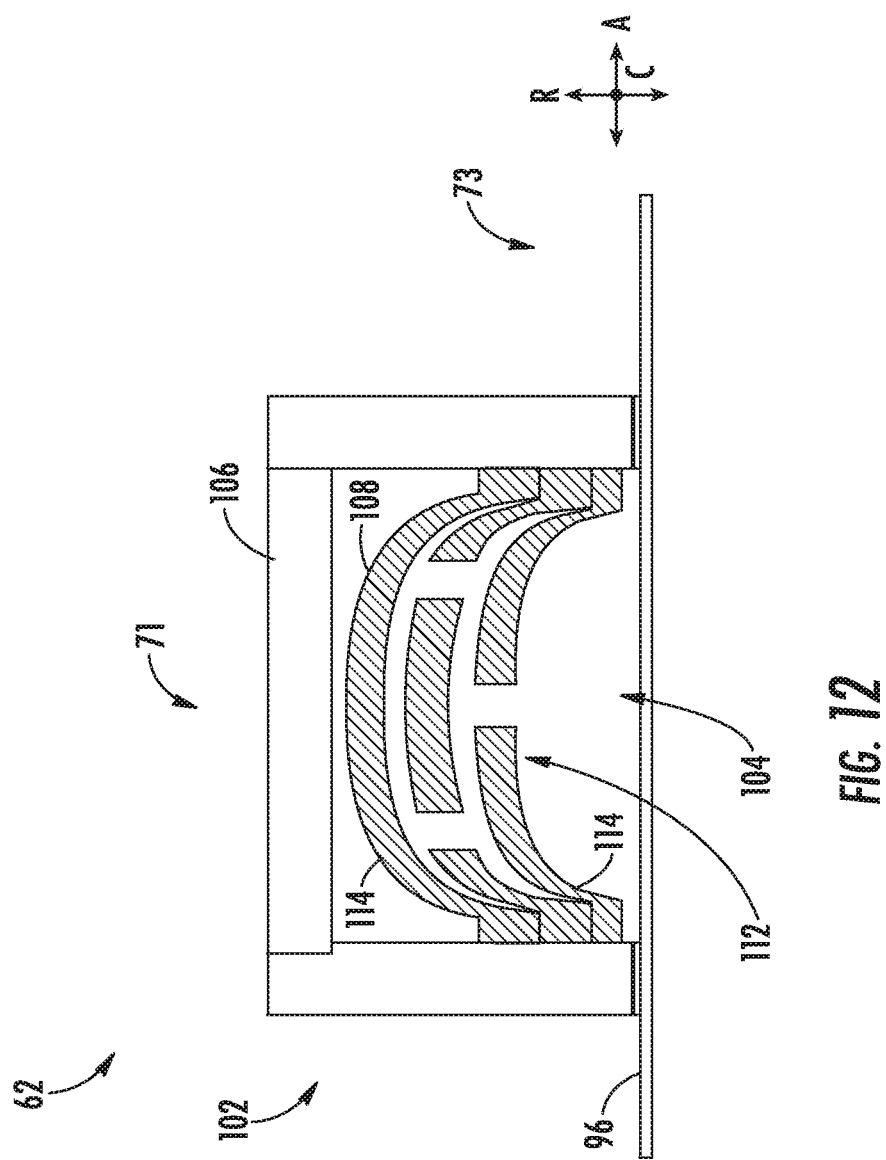

COMPOSITE FAN CONTAINMENT CASE

FIELD

The present subject matter relates generally to the fan containment case of a gas turbine engine, more particularly, to an integrated stiffener for a composite fan containment case of a gas turbine engine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Turbofan gas turbine engines typically include a fan assembly that channels air to the core gas turbine engine, such as an inlet to the compressor section, and to a bypass duct. Gas turbine engines, such as turbofans, generally include fan cases surrounding a fan assembly including the fan blades.

In most turbofan engines, the fan is contained by a fan case that is equipped with a shroud. The shroud circumscribes the fan and is adjacent to the tips of the fan blades. The shroud serves to channel incoming air through the fan so as to ensure that most of the air entering the engine will be compressed by the fan. A small portion of the air is able to bypass the fan blades through a radial gap present between the tips of the fan blades and the shroud. The radial gap is very narrow such that the amount of air that is able to bypass the fan through the gap is limited. The efficiency of the engine can be significantly improved in this way. Because the gap is narrow, the fan blades may rub the shroud during the normal operation of an aircraft turbofan engine. Further, the fan blades of a gas turbine engine can be susceptible to extreme loading events. For instance, a fan blade might strike a bird that is ingested into the engine, or a blade-out occurrence may arise wherein one of the fan blades is severed from a rotor disk. If the impact is large enough, a fan blade may contact the fan case.

Fan cases are generally configured to withstand an impact of the fan blades due to adverse engine conditions resulting in a failure mode, such as foreign object damage, hard rubs due to excessive or extreme unbalance or fan rotor oscillations, or fan blade liberation. Fan cases typically include one or more stiffeners bonded to an outer surface to improve the strength of the fan case and/or to control the frequency response of the fan case. However, such stiffeners typically do not improve flange load distribution on the fan casing after a blade-out event. Further, such stiffeners are typically designed to detach from the fan casing during a blade-out event.

As such, a need exists for an improved fan casing that reduces the flange loading on the fan casing.

BRIEF DESCRIPTION

Aspects and advantages will be set forth in part in the following description, or may be obvious from the description, or may be learned through practice of the invention.

In one aspect, the present subject matter is directed to a composite fan casing for a gas turbine engine defining a central axis. The composite fan casing includes a core having a plurality of core layers of reinforcing fibers bonded together with a thermosetting polymeric resin and having an outer surface. The composite fan casing further includes at least one stiffener integrally coupled to an aft portion of the outer surface of the core relative to the central axis. Additionally, the at least one stiffener includes an elastic material.

In one embodiment, the elastic material may include a shape memory alloy. In another embodiment, the elastic material may include at least one of a polymer, elastomer, or rubber. In a still further embodiment, the elastic material may include a shape memory alloy and at least one other elastic material different than the shape memory alloy. In further embodiments, the shape memory alloy may include at least one of nickel-titanium, a nickel-titanium based alloy, a copper-aluminum-nickel alloy, or an alloy containing zinc, copper, gold, or iron.

In additional embodiments, the stiffener may be bonded to the outer surface of the core or formed integrally with the outer surface of the core. In one embodiment, the stiffener may be formed as a single integral component. In further embodiments, the stiffener may further include one or more stiffener layers of reinforcing fibers bonded together with the thermosetting polymeric resin. In one embodiment, the stiffener may include one or more layers of the shape memory alloy arranged to alternate with one or more layers of the at least one other elastic material layers different. In one such embodiment, the stiffener may include one or more layers of the shape memory alloy and one or more layers of the at least one other elastic material defining a lattice structure. In another embodiment, the stiffener may include an external hat-shaped structure and a mesh of the shape memory alloy housed within the hat-shaped structure.

In further embodiments, the thermosetting polymeric resin may include at least one of a vinyl ester resin, a polyester resin, an acrylic resin, an epoxy resin, or a polyurethane resin. In one embodiment, the reinforcing fibers may include at least one of carbon fibers, graphite fibers, glass fibers, ceramic fibers, or aromatic polyamide fibers.

In another aspect, the present subject matter is directed to a gas turbine engine defining a central axis. The gas turbine engine includes an engine shaft extending along the central axis and a compressor attached to the engine shaft and extending radially about the central axis. The gas turbine engine further includes a fan section including a plurality of fan blades drivingly coupled to the engine shaft. Moreover, each of the fan blades extends between a root and a tip in a radial direction relative to the engine shaft. The gas turbine engine also includes a combustor positioned downstream of the compressor to receive a compressed fluid therefrom. Further, the gas turbine engine includes a turbine mounted on the engine shaft downstream of the combustor to provide a rotational force to the compressor and fan section. Additionally, the gas turbine engine includes a composite fan casing radially surrounding the plurality of fan blades of the fan section. The composite fan casing includes a core having a plurality of core layers of reinforcing fibers bonded together with a thermosetting polymeric resin and having an outer surface. The composite fan casing further includes one or more stiffeners integrally coupled to an aft portion of the outer surface of the core relative to the central axis. Moreover, the at least one stiffener includes an elastic material.

In one embodiment, the elastic material may include a shape memory alloy. In another embodiment, the elastic material may include at least one of a polymer, elastomer, or rubber. In a still further embodiment, the elastic material may include a shape memory alloy and at least one other elastic material different than the shape memory alloy. In one embodiment, the stiffener may include one or more layers of the shape memory alloy arranged to alternate with one or more layers of the at least one other elastic material. In one such embodiment, the stiffener may include one or more layers of the shape memory alloy and one or more layers of the at least one other elastic material defining a lattice structure. In another embodiment, the stiffener may include an external hat-shaped structure and a mesh of the shape memory alloy housed within the hat-shaped structure. It should be further understood that the gas turbine engine may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 12 illustrates another embodiment of the stiffener of the composite fan containment casing of FIG. 3 in accordance with aspects of the present subject matter, particularly illustrating the stiffener including an internal mesh structure.

Figure 1:
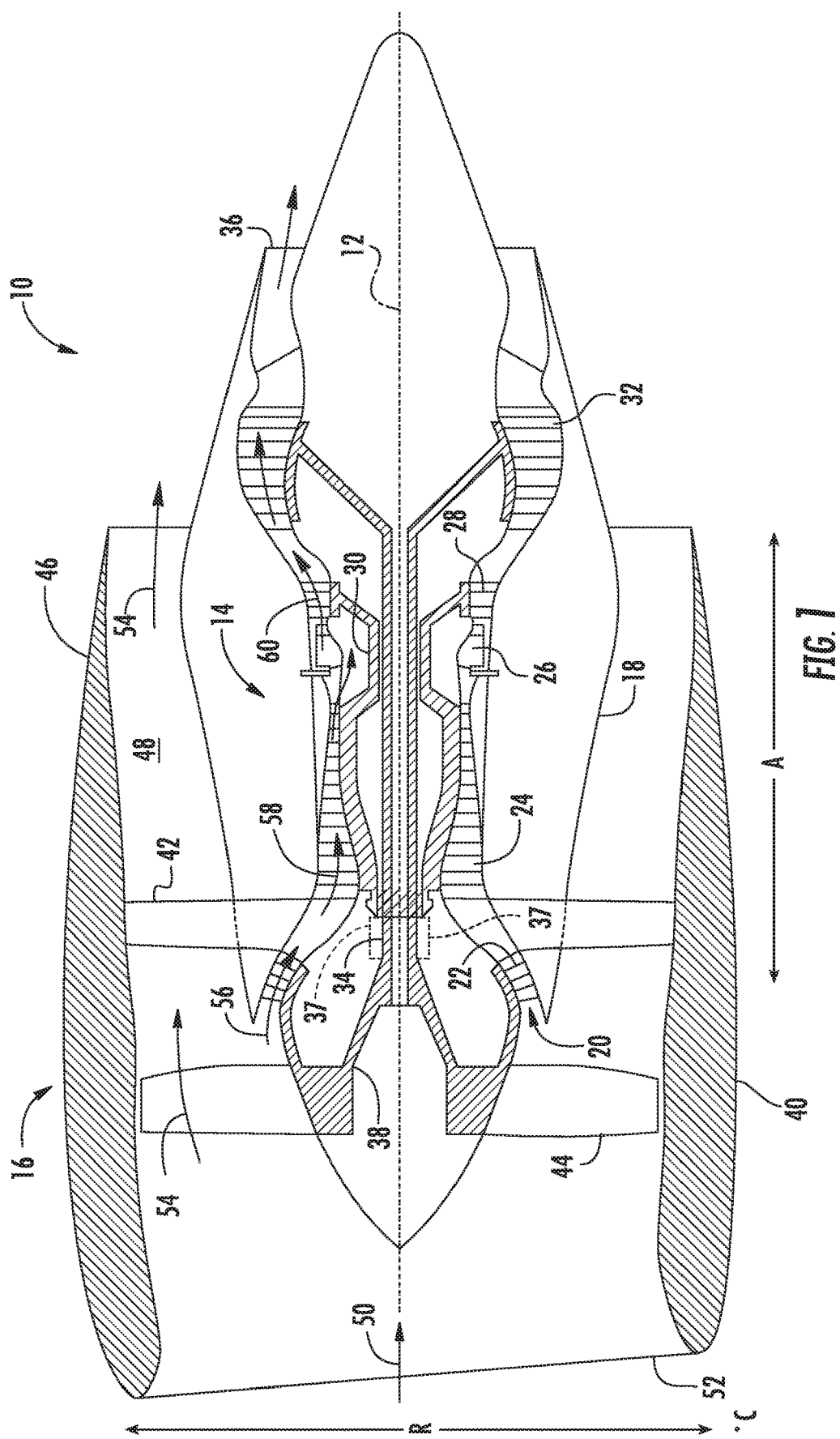
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A composite fan casing for a gas turbine engine is generally provided. The composite fan casing is generally a fan containment casing radially surrounding fan blades of a fan section of the gas turbine engine. The fan casing includes a core with one or more core layers of reinforcing fibers bonded together with a thermosetting polymeric resin and forming an outer surface of the fan casing. Additionally, the composite fan casing includes one or more stiffeners integrally coupled to or formed to an aft portion of the outer surface of the core. The stiffener includes an elastic material, such as a memory shape alloy. The stiffener is formed, at least in part, from the elastic material and integrally coupled to the fan casing may allow for the stiffener to deform locally in the event of an impact on the fan casing, such as from a rub on the fan casing from the fan blades or a blade-out event. Further, the elastic nature of the stiffener may allow for the stiffener to regain its shape after the impact on the fan casing. Generally, a stiffener that remains attached to the fan casing after such impact may continue to improve the strength of the fan casing, improve the flange loading distribution on the fan casing, and/or may improve the frequency response of the fan casing without impacting the overall flexibility of the fan casing. Additionally, by improving the flange loading on the fan casing, the fan casing may have improved joint capability with adjacent parts such as an aft fan casing. Moreover, such a stiffener may help reduce the weight of adjacent hardware like the aft fan casing.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extending perpendicular from the centerline 12. Further, a circumferential direction C (shown in/out of the page in FIG. 1) extends perpendicular to both the centerline 12 and the radial direction R. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Figure 2:
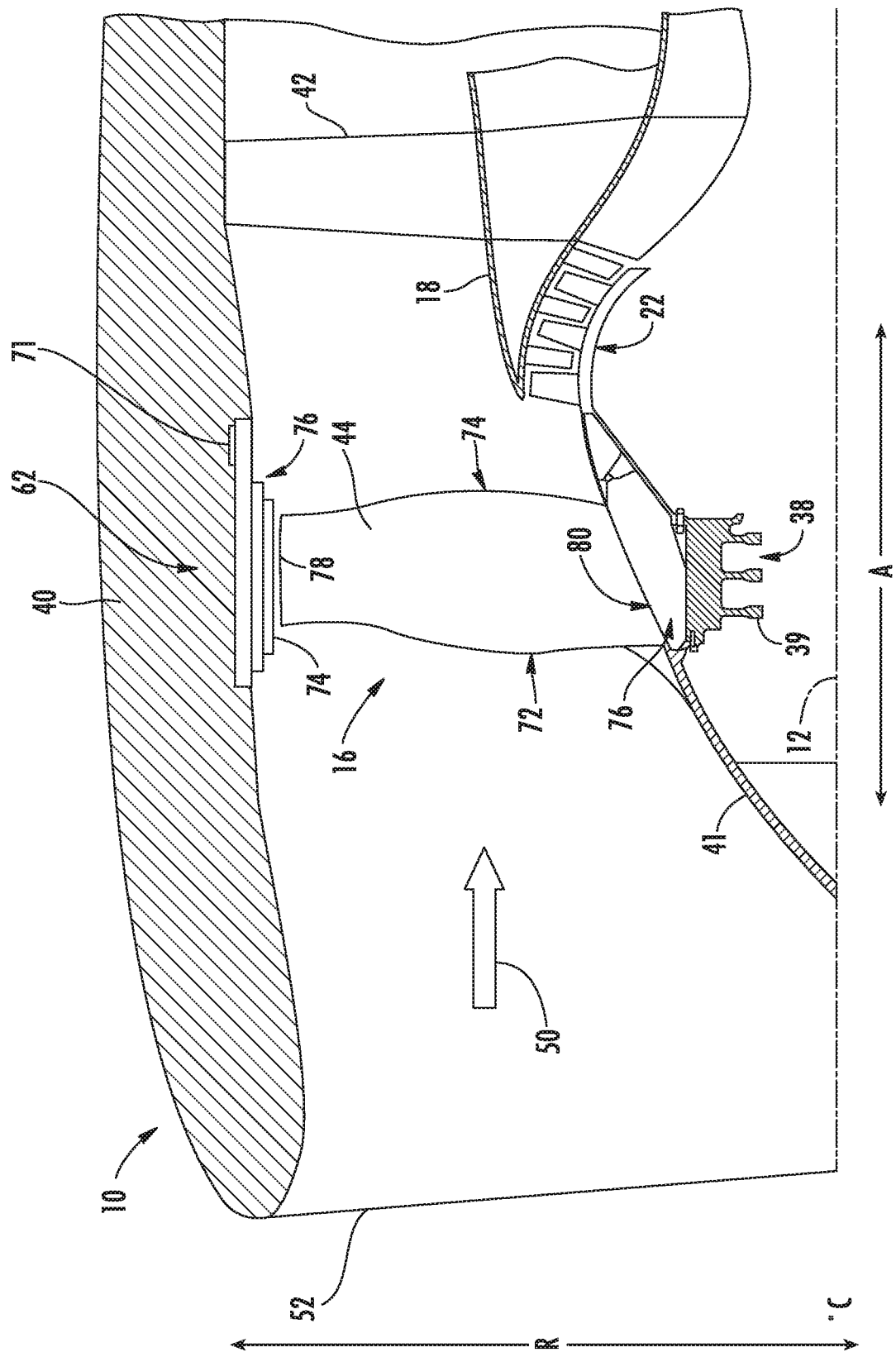
FIG. 2 illustrates a cross-sectional view of the fan section of FIG. 1 in accordance with aspects of the present subject matter, particularly illustrating a composite fan containment casing of a fan section of the gas turbine engine.

Additionally, as shown in FIGS. 1 and 2, the fan section 16 of the gas turbine engine 10 generally includes a rotatable, axial-flow fan rotor 38 configured to be surrounded by an annular nacelle 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required. Additionally, the fan rotor 38 and/or rotor disk 39 may be enclosed or formed as part of a fan hub 41.

It should be appreciated by those of ordinary skill in the art that the nacelle 40 may be configured to be supported relative to the core engine 14 by a plurality of substantially radially-extending, circumferentially-spaced outlet guide vanes 42. As such, the nacelle 40 may enclose the fan rotor 38 and its corresponding fan rotor blades (fan blades 44). Further, as shown, each of the fan blades 44 may extend between a root 77 and a tip 78 in the radial direction R relative to the centerline 12. Moreover, a downstream section 46 of the nacelle 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the nacelle 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

As illustrated in FIGS. 1 and 2, the gas turbine engine 10 may include a composite fan containment casing (fan casing 62) radially surrounding and circumscribing the fan blades 44. The fan casing 62 may be configured to channel the initial airflow flow 50 through the fan section 16 so as to ensure that the fan blades 44 will compress the bulk of the air entering the engine 10. Additionally, a small radial gap 76 may be present between tips 78 of the fan blades 44 and an inner annular surface 74 of the fan casing 62. Generally, the radial gap 76 may be minimized in order to promote the efficiency of the gas turbine engine 10. The inner annular surface 74 may have a generally circular cross-section and define an inner diameter of the fan casing 62.

Figure 3:
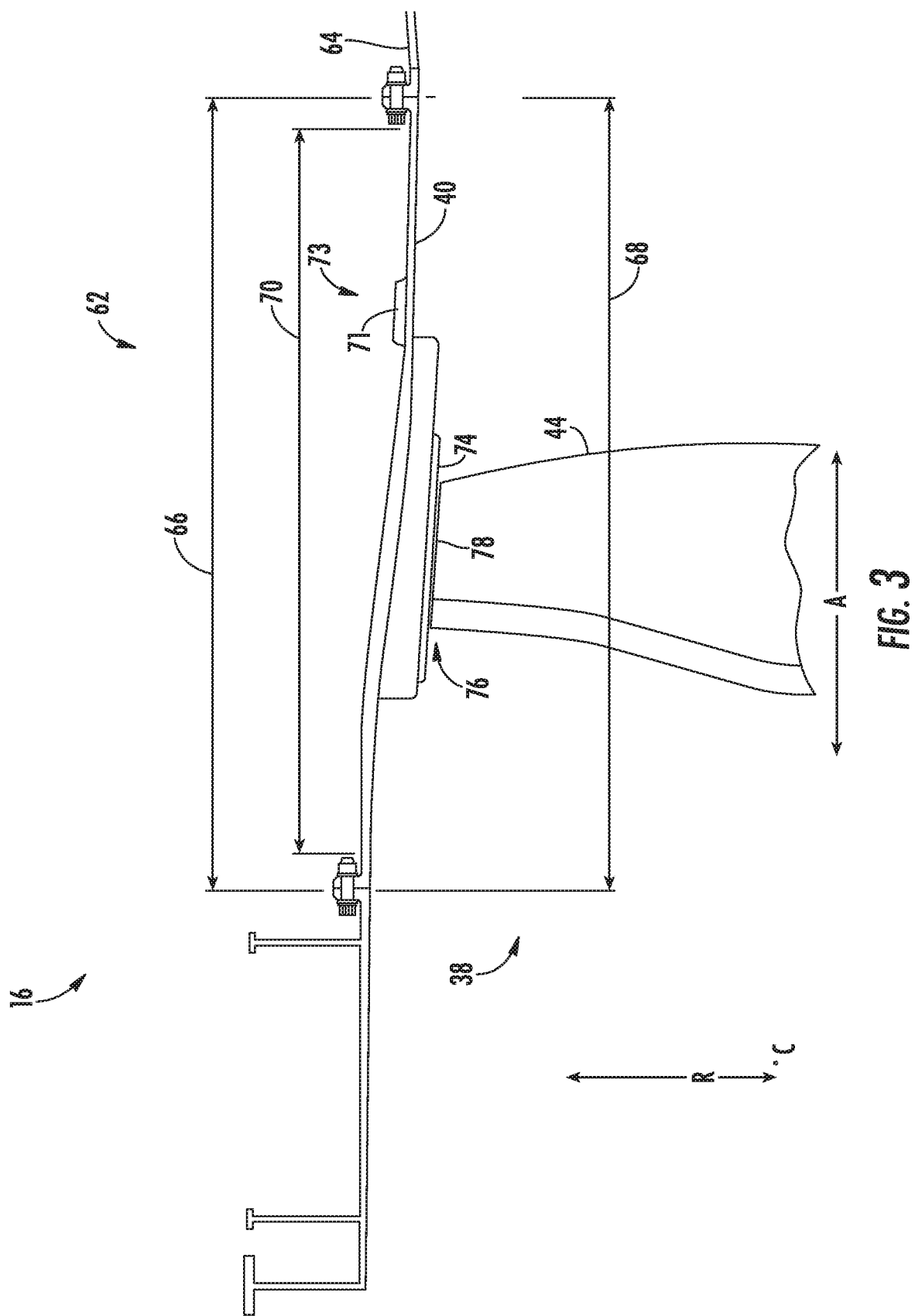
FIG. 3 illustrates one embodiment of the composite fan containment casing of FIG. 2, particularly illustrating a schematic cross-section of the composite fan containment casing in radial and axial directions of the gas turbine engine.

Referring now to FIG. 3, an exemplary fan casing 62 is illustrated in accordance with aspects of the present subject matter. In particular, FIG. 3 illustrates a schematic cross-section illustration of the fan casing 62 in the radial and axial directions R, A. As shown, the fan section 16 may include the forward fan case (referred to as the fan casing 62) surrounding the fan blades 44 and an aft fan casing 64 positioned aft of the fan blades 44 relative to the centerline 12 (FIG. 1). In the exemplary embodiment, fan casing 62 is a hardwall containment system that includes a length 66 that is approximately equal to a fan assembly length 68 of the fan rotor 38 (FIG. 2). More specifically, length 66 may be variably sized so that the fan casing 62 circumscribes a prime containment zone 70 of fan section 16. The prime containment zone 70, as used herein, is defined as a zone extending both axially and circumferentially around the fan rotor 38 where the fan blade(s) 44 is most likely to be ejected from fan rotor 38.

As further illustrated, the fan casing 62 may include one or more stiffeners 71 integrally coupled to an aft portion 73 of the fan casing 62 along the axial direction A relative to the fan blades 44. Generally, the stiffener(s) 71 coupled to the fan casing 62 may increase the strength or stiffness of the fan casing 62. For instance, the stiffener(s) 71 may allow the fan casing 62 to better withstand a soft or hard rub of the fan blade(s) 44 on the inner annular surface 74. Further, the stiffener(s) 71 may improve the ability of the fan casing 62 to withstand an impact on the inner annular surface 74, such as from a blade-out event. As described in more detail in regard to FIGS. 7-12, the stiffener(s) 71 may include at least an elastic material. Moreover, stiffener(s) 71 formed from an elastic material and integrally coupled to or formed integrally with the fan casing 62 may prevent the stiffener(s) 71 from being separated from the rest of the fan case 62 following a hard-rub or impact on the fan casing 62. Moreover, integrally coupled, as used here, refers to coupling the stiffener(s) 71 to the fan casing 62 such that the stiffener(s) 71 is configured to remain attached or coupled to the fan casing 62 following an impact or rub on the fan casing 62.

Figure 4:
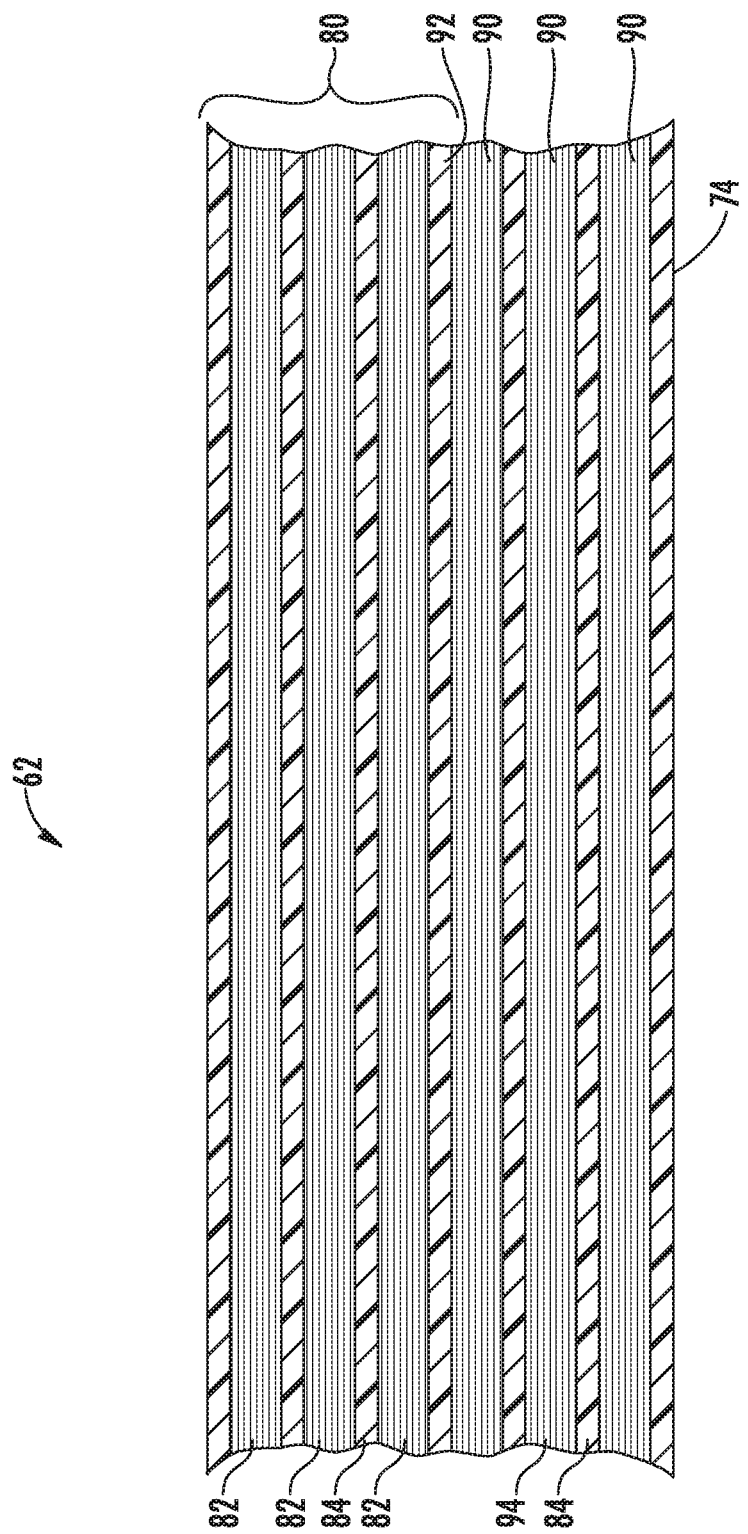
FIG. 4 illustrates a schematic cross-section of a portion of an exemplary embodiment of the composite fan containment casing in accordance with aspects of the present subject matter, particularly illustrating the composite fan containment casing formed from a plurality of layers.
Figure 5:
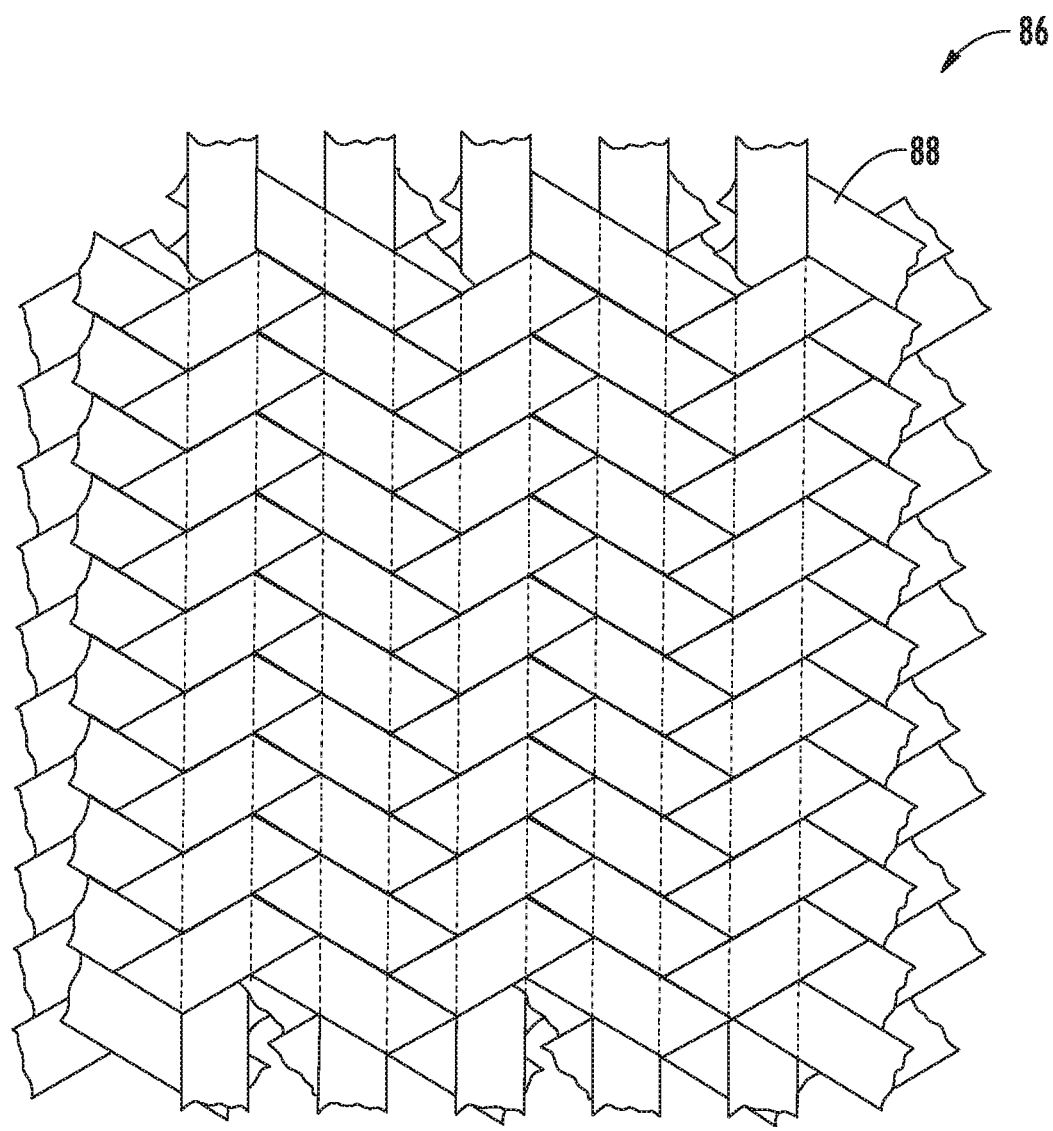
FIG. 5 illustrates an embodiment of the reinforcing fibers of the composite fan containment casing in accordance with aspects of the present subject matter, particular showing the reinforcing fibers braided into a mat.

Referring now to FIG. 4, a schematic cross-section is illustrated of a portion of an exemplary embodiment of the fan casing 62. In particular, FIG. 4 illustrates the fan casing 62 formed from a plurality of layers. For instance, in the exemplary embodiment, fan casing 62 may include a core 80 that is formed by a plurality of core layers 82 of reinforcing fibers bonded together by a thermosetting polymeric resin 84. Each core layer 82 may include a plurality of braids of the reinforcing fibers. Referring also to FIG. 5, in one embodiment, the reinforcing fibers are braided into a braided mat 86 where the braids are aligned to extend in a circumferential direction. The braids may be formed by braiding fiber tows 88 containing about 10,000 to about 30,000 fibers per tow. In alternate embodiments fiber tows 88 can contain less than 10,000 fibers or greater than 30,000 fibers. However, the strength of core 80 may be reduced when the tows contain less than 10,000 fibers, and the weight of fan casing 62 may be increased when fiber tows 88 contain greater than 30,000 fibers. In one embodiment, the reinforcing fibers may include at least one of carbon fibers, graphite fibers, glass fibers, ceramic fibers, or aromatic polyamide fibers. However, in other embodiments, any other suitable fibers in any other arrangement may be utilized to form the fan casing 62 or components thereof. Additionally, the thermosetting polymeric resin 84 may include, as non-limiting examples, at least one of a vinyl ester resin, a polyester resin, an acrylic resin, an epoxy resin, or a polyurethane resin.

Figure 6:
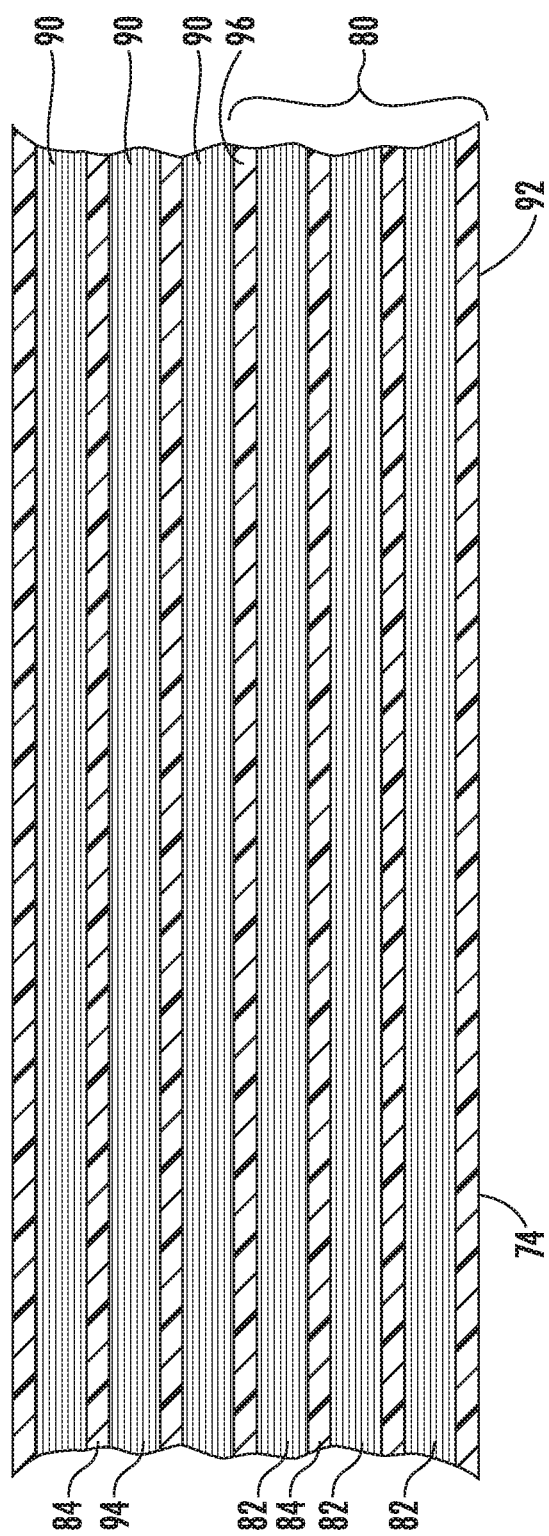
FIG. 6 illustrates a schematic cross-section of a portion of another exemplary embodiment of the composite fan containment casing in accordance with aspects of the present subject matter, particularly illustrating build-up layers bonded to an outer surface of a core of the composite fan containment casing.

The fan casing 62 may also include a plurality of build-up layers 90 bonded to an inner surface 92 of core 80. The build-up layers 90 may be formed from spiral wound braids 94 of reinforcing fibers bonded together by the thermoset resin 84. The spiral winding pattern of the braids of reinforcing fibers may reduce layer drop off during impact which in turn reduces stress concentration. It should also be appreciated that, in certain embodiment, such as illustrated in FIG. 4, the inner most build-up layer and/or inner most layer of thermoset resin 84 may define the inner annular surface 74. During impact, the kinetic energy may be dissipated by delamination of build-up layers 90 and core layers 82. The delaminated build-up layers 90 and core layers 82 may capture and contain impact objects. In another embodiment, shown in FIG. 6, build-up layers 90 may be bonded to an outer surface 96 of core 80. In such an embodiment, the inner surface 92 of the core 80 may define the inner annular surface 74. In still another embodiment, build-up layers 90 may be bonded to both the outer surface 96 and inner surface 92 of core 80.

Fan casing 62 may fabricated, in the exemplary embodiment, by bonding together core layers 82 and build-up layers 90 together with the thermosetting polymeric resin 84. Particularly, a mold may be used to define the desired size and shape of fan casing 62. Build-up layers 90, core layers 82, and the thermoset resin 84 may be positioned in the mold. A vacuum may be applied to the layered structure in the mold by any suitable method, for example vacuum bagging, and heat may be applied to the structure to cure the thermoset resin 84. Heat may be applied to the layered structure by any suitable method, for example, by placing the layered structure in a heat chamber, oven, or autoclave. The vacuum may pull the thermosetting polymeric resin 84 into and impregnate the fiber tows 88, such as the braided mat 86, to provide added strength to fan casing 62.

Figure 7:
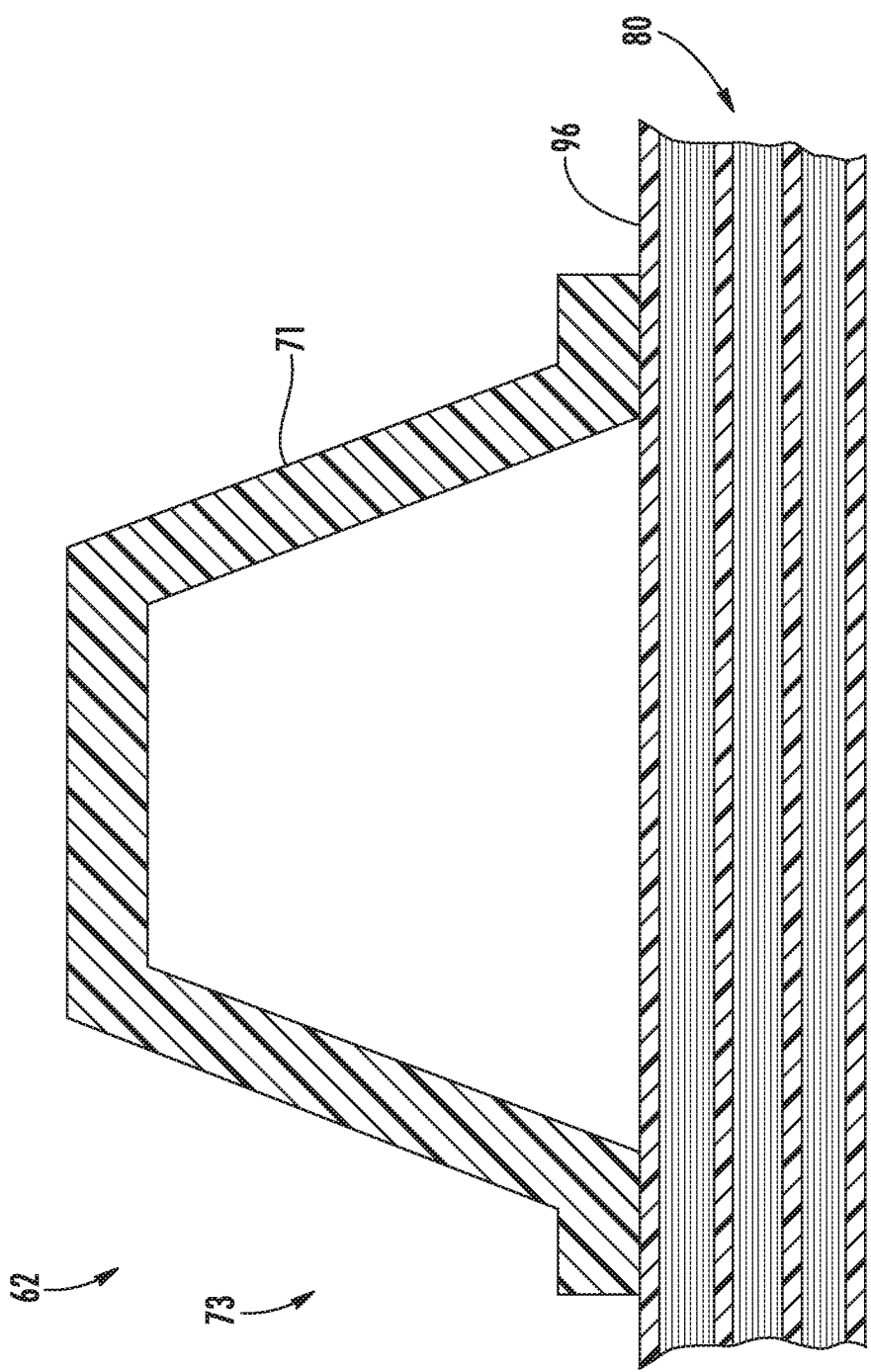
FIG. 7 illustrates one exemplary embodiment of a stiffener of the composite fan containment casing of FIG. 3 in accordance with aspects of the present subject matter, particularly illustrating the stiffener integrally coupled to an outer surface of a core at an aft portion of the composite fan containment casing.

Referring to FIG. 7, one exemplary embodiment of the stiffener 71 of FIG. 3 is illustrated in accordance with aspects of the present subject matter. For instance, the fan casing 62 may include at least one stiffener 71 integrally coupled to the outer surface 96 of core 80 at the aft portion 73 of the fan casing 62 (as shown generally in FIG. 3). However, in other embodiments, the stiffener(s) 71 may be integrally coupled to an outer most layer of the build-up layers 90, such as in the embodiment illustrated in FIG. 6. It should be appreciated that the stiffener(s) 71 integrally coupled to the aft portion 73 of the fan casing 62 may not only increase the strength of the fan casing 62 but may also improve the flange loading on the fan casing 62. Stiffener(s) 71 may have a substantially inverted U-shape and may be formed at least in part from one or more elastic materials. In alternative embodiments, the stiffener(s) 71 may have an I-shape or any other suitable shape. Further, though the stiffener 71 will be described in reference to the fan casing 62 of FIGS. 1-6, it should be appreciated that the stiffener(s) 71 may be utilized with any suitable fan casing of a gas turbine engine, such as the gas turbine engine 10 described generally in regard to FIGS. 1-2 or further suitable configurations of a gas turbine engine.

Further, the stiffener(s) 71 may be configured to remain coupled to the fan casing 62 following a rub of the fan blade(s) 44 on the inner annular surface 74 or an impact on the fan casing 62. For instance, known current stiffeners may be configured to detach or break away from the remainder of the fan casing 62 during a blade-out event in order to reduce strain on fan casing 62 and/or the fan rotor 38. More particularly, at least some past stiffeners may reduce the overall flexibility of the fan casing 62 allowing damage to the fan casing 62 and/or fan rotor 38 during a blade-out event or hard rub unless the stiffeners break or detach from the fan casing 62. However, such detachable stiffeners are no longer able to strengthen the fan casing 62 after the blade-out event, improve the flange loading distribution after the blade-out event, or improve the frequency response of the fan casing 62. In several embodiments, the stiffener(s) 71 of the current disclosure are able to deform locally in the event of a blade-out event due to the nature of the elastic material. As such, the stiffener(s) 71 may be configured to remain integrally coupled to the fan casing 62 without impacting the overall flexibility of the fan casing 62. Moreover, a stiffener(s) 71 that remains coupled to the fan casing 62 following a blade-out event may continue to improve the strength of the fan casing 62, improve flange loading on the fan casing 62, and/or improve the frequency response of the fan casing 62.

As further illustrated in reference to FIG. 7, the stiffener 71, including the elastic material, may be bonded to the outer surface 96 of the core 80. In further embodiments, the stiffener may be formed integrally with the outer surface 96 of the core 80. For instance, the stiffener 71 may include one or more composite components that may be laid up with the composite core 80 (see, e.g., FIG. 10). However, in other embodiments, the stiffener 71 may be formed via additive manufacturing. For instance, the stiffener 71 may be printed via additive manufacturing directly on the composite fan casing 62, such as the outer surface 96 of the core 80. However, in other embodiments, the stiffener 71 may separately be formed via additive manufacturing and then integrally coupled to the fan casing 62, such as via bonding with a resin or adhesive. Additionally, it should be appreciated that the stiffener 71, may be formed, laid up, printed, or otherwise made as a single integral component (e.g., the stiffener 71 may be a single piece absent multiple pieces that require assembly to form the completed integral stiffener 71).

The elastic material may include one or more of (but not limited to) a polymer, elastomer, or rubber. In further embodiments, the elastic material may additionally, or alternatively, include a shape memory alloy (SMA). A SMA is generally an alloy capable of returning to its original shape after being deformed. For instance, certain SMAs may be heated in order to return a deformed SMA to its pre-deformed shape. Further, SMAs may act as a lightweight, solid-state alternative to traditional actuators. Exemplary, but non-limiting examples of SMAs that may be suitable for forming the stiffener(s) 71 may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA may include a copper-aluminum-nickel alloy or alloys containing zinc, copper, gold, and/or iron. Moreover, SMAs may also display superelasticity. Superelasticity may generally be characterized by recovery of large strains, potentially with some dissipation. For instance, martensite and austenite phases of the SMA may respond to mechanical stress as well as temperature induced phase transformations. For example, SMAs may be loaded in an austenite phase (i.e. above a certain temperature). As such, the material may begin to transform into the (twinned) martensite phase when a critical stress is reached. Upon continued loading and assuming isothermal conditions, the (twinned) martensite may begin to detwin, allowing the material to undergo plastic deformation. If the unloading happens before plasticity, the martensite may generally transform back to austenite, and the material may recover its original shape by developing a hysteresis.

Figure 9:
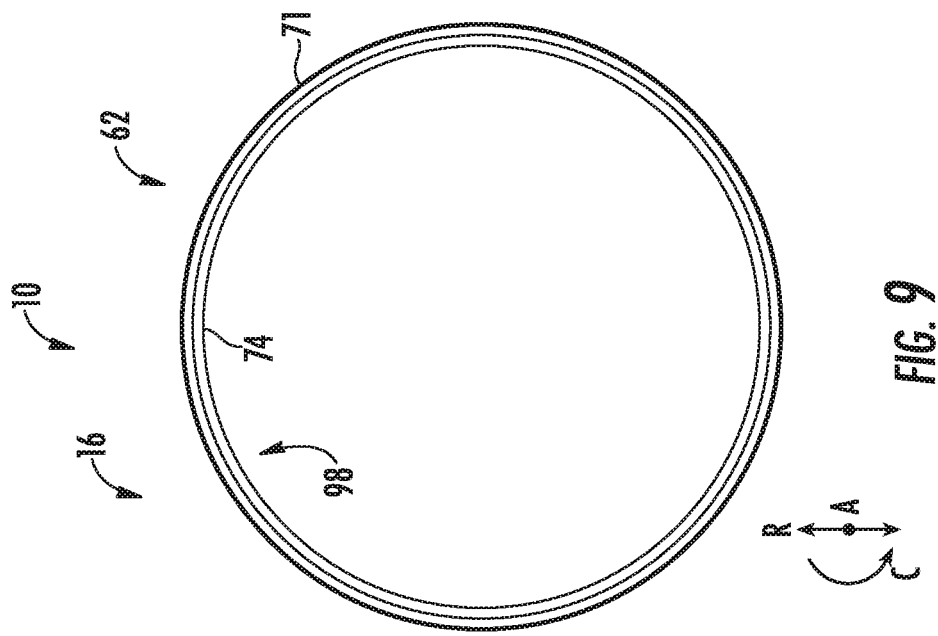
FIG. 9 illustrates another cross-sectional view of the fan section of FIG. 8 in accordance with aspects of the present subject matter, particularly illustrating the composite fan containment casing after the deformation.
Figure 8:
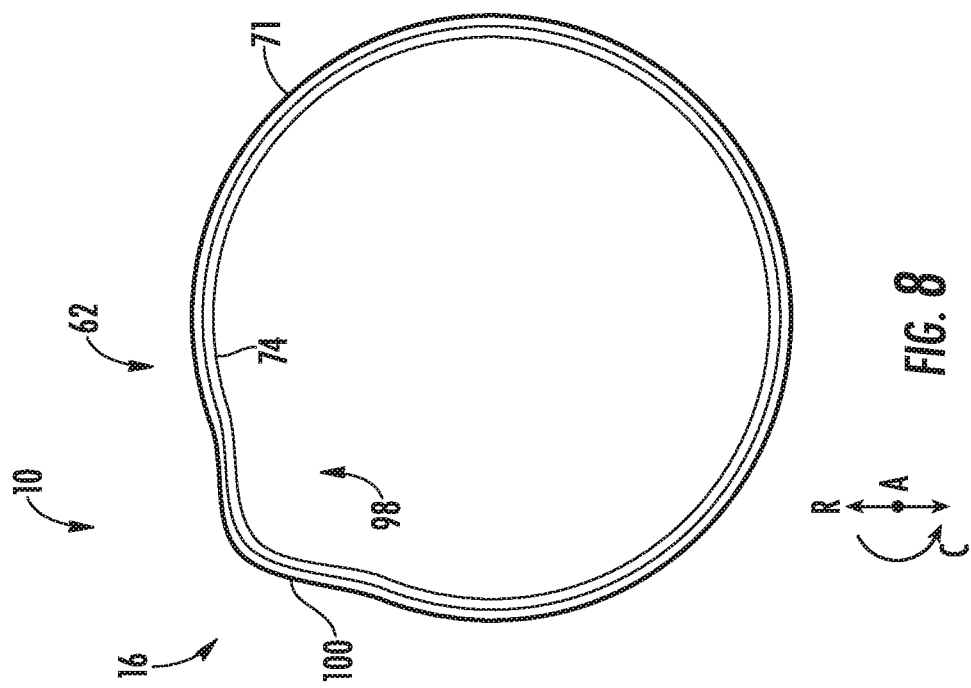
FIG. 8 illustrates a cross-sectional view of one embodiment of the fan section taken at the stiffener in accordance with aspects of the present subject matter, particularly illustrating the composite fan containment casing under a deformation.

Referring now to FIGS. 8 and 9, cross-sectional views of the fan section 16 taken at the stiffener 71 are illustrated in accordance with aspects of the present disclosure. Particularly, FIG. 8 illustrates the fan casing 62 under a deformation, such as caused by a blade impact, and FIG. 9 illustrates the fan casing 62 after the deformation. It should be appreciated that the fan rotor 38 and nacelle 40 of the gas turbine engine 10 of FIGS. 8 and 9 have been omitted for clarity. Additionally, it should be recognized the following description is applicable to the gas turbine engine 10, fan section 16, and fan casing 62 as described generally in reference to FIGS. 1-7 or any other suitable configurations of the same.

In the illustrated embodiment, the stiffener 71 may fully subscribe the fan casing 62 in the circumferential direction C. As shown particularly in FIG. 8, the inner annular surface 74 of the fan casing 62 may define a blade impact zone 98 where a fan blade 44 (see, e.g., FIGS. 1 and 2) may engage the fan casing 62. For example, a fan blade 44 may have a hard or soft rub on the inner annular surface 74 or a blade-out event may occur where the a fan blade 44 or a fragment of a fan blade 44 may impact the fan casing 62 at the blade impact zone 98. As such, a deformation 100 may occur within the stiffener 71 and/or fan casing 62 at the blade impact zone 98. As shown in FIG. 9, after the blade impact, or other cause of the deformation 100, the fan casing 62 and stiffener 71 may return to their original or approximately original geometry at the blade impact zone 98. For instance, the elastic material of the stiffener 71 may allow the stiffener 71 and fan casing 62 to elastically deform during the fan blade 44 impact (or any other impact on the fan casing 62) and subsequently return to their respective original geometries, or approximately their original geometries. Further, the elastic nature of the stiffener(s) 71 may allow the stiffener(s) 71 to remain coupled to the fan casing 62, thus allowing the stiffener(s) 71 to improve the strength of the fan casing 62, improve flange loading on the fan casing 62, and/or improve the frequency response of the fan casing 62 after an impact on the fan casing 62.

Figure 10:
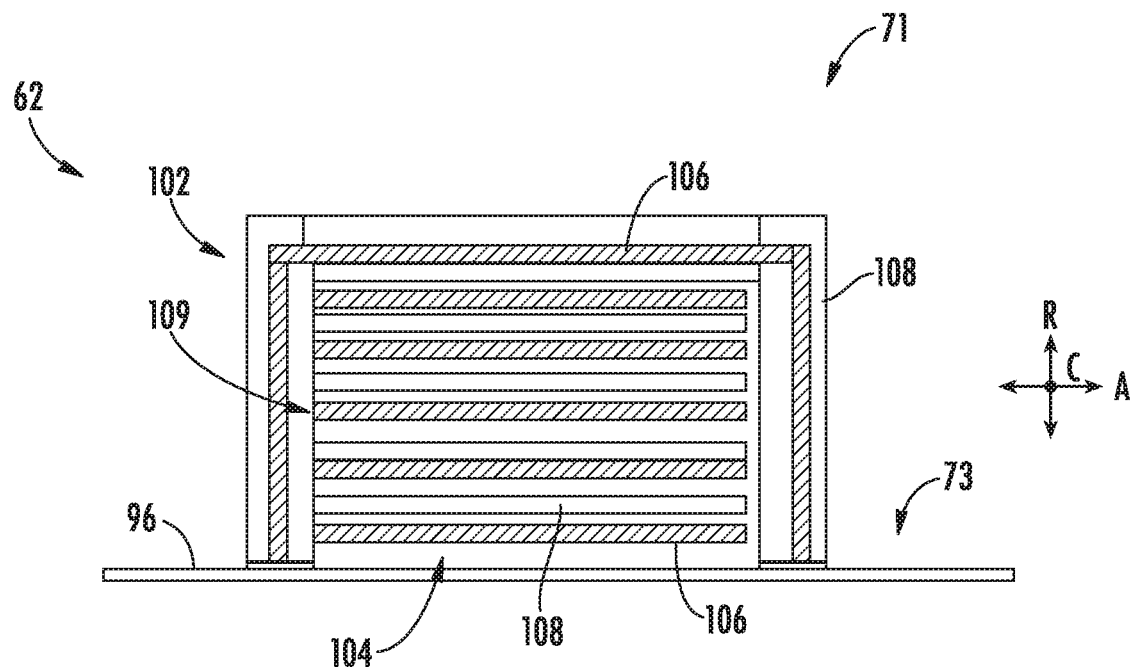
FIG. 10 illustrates another embodiment of the stiffener of the composite fan containment casing of FIG. 3 in accordance with aspects of the present subject matter, particularly illustrating the stiffener formed from two or more materials.

Referring now to FIG. 10, one embodiment of the stiffener 71 is illustrated in accordance with aspects of the present disclosure. Particularly, FIG. 10 illustrates the stiffener 71 formed from two or more materials. For example, the stiffener 71 may be formed from one or more layers. Moreover, at least one of the layers may include an elastic material as described herein. More particularly, in the illustrated embodiment, the stiffener 71 may include a first material 106 and a second material 108. In certain embodiments, the first material 106 may include at least one elastic material as described herein, such as an SMA. The stiffener 71 may form a hat-shaped structure (hat cross-section 102) defining an internal cavity 104. For instance, the first material 106 including the elastic material may be formed into the hat cross-section 102. However, in other embodiments, the stiffener 71 may be formed into any other suitable shape.

Additionally, as shown, the stiffener 71 may include a second material 108. For instance, the second material 108 may include another elastic material, such as, but not limited to, another SMA material, a polymer, elastomer, or rubber. In a further embodiment, the second material 108 may include one or more stiffener layers of reinforcing fibers bonded together with a thermosetting polymeric resin, as described generally in regard to FIGS. 3-5. For instance, in certain embodiments, at least a portion of the second material 108 including reinforcing fibers bonded together with the thermosetting polymeric resin 84 may be formed (e.g., laid up and consolidated) with the remainder of the composite fan casing 62. However, in an additional or alternative embodiment, the thermosetting polymeric resin used in the second material 108 may be the different than the thermosetting polymeric resin 84 used in the core 80. Still, in other embodiments, the second material 108 may include any other material, such as a filler material, foam, coating, metal, plastic, etc.

As shown in FIG. 10, the hat cross-section 102 of the stiffener 71 may be defined by a first layer of the first material 106 sandwiched between layers of the second material 108. However, in other embodiments, the hat cross-section 102 of the stiffener 71 may be defined by one layer each of the first and second materials 106, 108 or two layers of the first material 106 sandwiching one layer of the second material 108. Additionally, as shown, the internal cavity 104 of the hat may be filled with one or more layers of the first and/or second material 106, 108 to form a layered structure 109. For example, in the illustrated embodiment, the internal cavity 104 may include layers of the first material 106, such as a SMA material, alternating with layers of the second material 108, such as another elastic material or rereinforcing fibers and thermosetting polymeric resin. It should be appreciated that, in other embodiments, the stiffener 71 may include additional materials as desired or required. For example, the stiffener 71 may include three or more different materials arranged in layers, at least one of which may be an elastic material as described herein. Moreover, the stiffener 71 including the first and second materials 106, 108 and any additional materials may be formed as a single integral component. For instance, the various materials used to form the stiffener 71 may be bonded together or formed together integrally. In one embodiment, the entire stiffener 71 may be formed via additive manufacturing such that each material may be printed in a layer-by-layer fashion.

Figure 11:
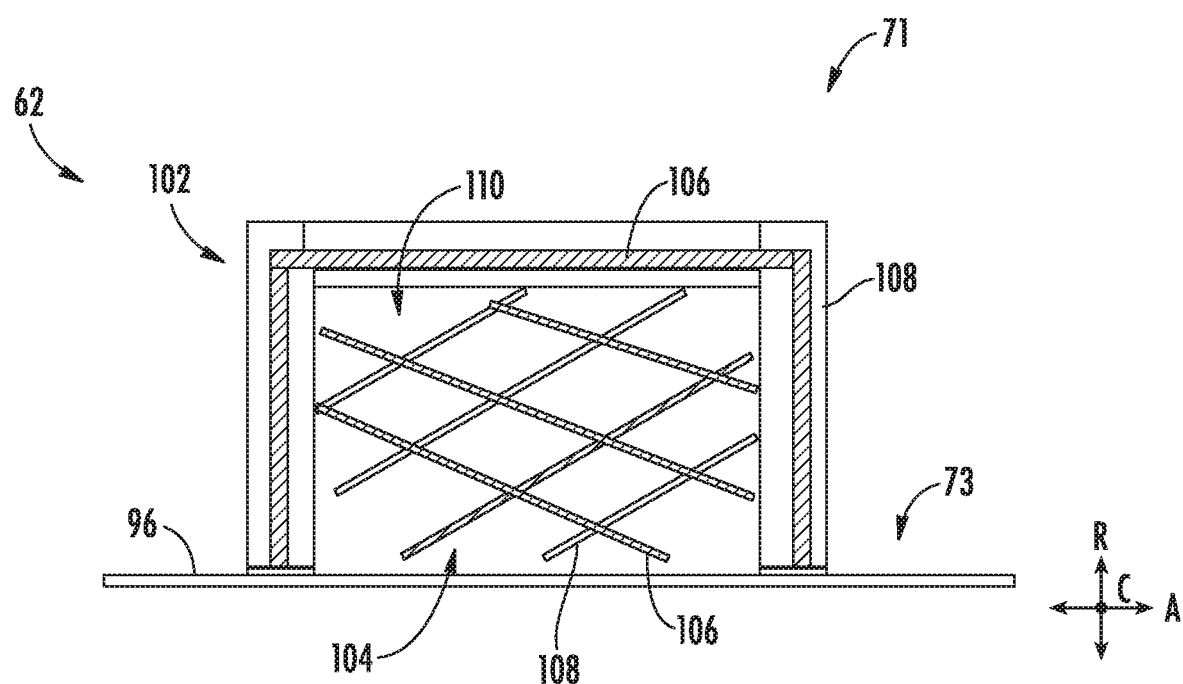
FIG. 11 illustrates a further embodiment of the stiffener of the composite fan containment casing of FIG. 3 in accordance with aspects of the present subject matter, particularly illustrating the stiffener including an internal lattice structure.

Referring now to FIG. 11, another exemplary embodiment of the stiffener 71 is illustrated in accordance with aspects of the present subject matter. More particularly, FIG. 11 illustrates the stiffener 71 including an internal lattice structure 110. Generally, the stiffener 71 of FIG. 11 may be configured as the stiffener 71 of FIG. 10. For example, the stiffener 71 may include the first and/or second materials 106, 108 forming the hat cross-section 102 defining the internal cavity 104. Further, at least one of the first or second materials 106, 108 may include an elastic material, such as a SMA material. However, as shown in FIG. 11, the internal cavity 104 of FIG. 11 may include an internal lattice structure 110 instead of the layered structure 109 of FIG. 10.

More particularly, as shown in FIG. 11 the first and second materials 106, 108 may define the internal lattice structure 110 (represented by intersecting first and second materials 106, 108 in FIG. 11) housed within the internal cavity 104 of the hat cross-section 102. For instance, layers of at least one of the first material 106 or second material 108 may be notched and/or grooved in order to form the internal lattice structure 110. Additionally, layers of the first and second materials 106, 108 may be woven together. In additional or alternative embodiments, the internal lattice structure 110 of the first and second materials 106, 108 may be embedded within the internal cavity 104 and formed with the first and/or second material 106, 108 of the hat cross-section 102 utilizing additive manufacturing. In an additional or alternative embodiment, the internal lattice structure 110 may be coupled to the first and/or second material 106, 108 of the hat cross-section 102, such as via an adhesive or the thermosetting polymeric resin.

Referring now to FIG. 12, another exemplary embodiment of the stiffener 71 is illustrated in accordance with aspects of the present subject matter. More particularly, FIG. 12 illustrates the stiffener 71 including an internal mesh structure 112. Additionally, the exemplary stiffener 71 of FIG. 12 may include a first material 106 forming the hat cross-section 102. In the embodiment of FIG. 12, the first material 106 may include at least one of an elastic material, reinforcing fibers bonded together with the thermosetting polymeric resin 84, a filler material, foam, coating, metal, plastic, or any other suitable material. However, in other embodiments, the hat cross-section 102 may be formed from additional materials, such as a second material 108 as describe in regard to FIG. 10. Further, the stiffener 71 may define the internal cavity 104 as described generally in regard to FIG. 10. However, instead of the layered structure 109 as shown in FIG. 10 or the internal lattice structure 110 as shown in FIG. 11, the stiffener 71 of FIG. 12 may house the internal mesh structure 112 within the internal cavity 104.

As shown in FIG. 12, internal mesh structure 112 may be formed from the second material 108. Further, in the exemplary embodiment of FIG. 12, the second material 108 may include an elastic material, such as a SMA material. For instance, two or more mesh layers 114 may be stacked radially within the internal cavity 104 of the stiffener 71, e.g., the internal cavity 104 defined by the hat cross-section 102. For example, mesh layers 114 may be stacked to fill or substantially fill the internal cavity 104. However, in another embodiment, the mesh layers 114 may be stacked such that a portion of the internal cavity 104 remains unfilled with the second material 108.

Referring now generally to the embodiments of the stiffener(s) 71 described in reference to FIGS. 7-12, the elastic material, for example an SMA material included in the first and/or second materials 106, 108, of the stiffener(s) 71 may be compressed during an impact on the composite fan casing 62. For instance, a hard or soft rub on the inner annular surface 74 or a blade-out event or other impact on the composite fan casing 62 may place a strain on the fan casing 62. Moreover, radial motion on the stiffener(s) 71 caused by such event may compress the elastic material and provide dampening to the stiffener(s) 71. As such, the elastic nature of the elastic material may allow for the stiffener(s) 71 to remain attached to the remainder of the fan casing 62 following such an event. Further, a stiffener(s) 71 that remains attached to the remainder of the composite fan casing 62 may continue to increase the strength of the fan casing 62, improve the frequency response of the fan casing 62, and/or improve the flange loading on the fan casing following such an event. Additionally, in certain embodiments, the elastic material (such as a layered structure 109, an internal lattice structure 110, and/or an internal mesh structure 112 of SMA material) may be pre-strained in order to increase the stiffness provided by the stiffener(s) 71.

In general, the exemplary embodiments of the fan casing 62, such as the stiffener(s) 71, described herein may be manufactured or formed using any suitable process. However, in accordance with several aspects of the present subject matter, the stiffener(s) 71 may be formed using an additive-manufacturing process, such as a 3D printing process. The use of such a process may allow the stiffener(s) 71 to be formed integrally, as a single monolithic component, or as any suitable number of sub-components. Forming stiffener(s) 71 via additive manufacturing may allow the internal cavity(ies) 104 to be integrally formed and include a variety of features or structures not possible when using prior manufacturing methods. For example, the additive manufacturing methods described herein enable the manufacture of the hat cross-section 102 and/or the internal cavity 104 having any suitable size and shape with one or more configurations, some of these novel features or structures being described herein. For instance, the geometry of the internal cavity 104 and associated structures depicted in FIGS. 10-12 may be produced via additive manufacturing methods.

As used herein, the terms "additive manufacturing," "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component that may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, in various embodiments of the stiffener(s) 71 described herein, the material may include an elastic material, such as a SMA material. Further, in accordance with other exemplary embodiments of the present subject matter, the additively manufactured components described herein may be formed at least in part of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the fan casing 62, stiffener(s) 71, and/or internal passageways such as the internal cavity 104, openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

In addition, utilizing an additive process, the surface finish and features of the components may vary as needed depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

While the present disclosure is not limited to the use of additive manufacturing to form these components generally, additive manufacturing does provide a variety of manufacturing advantages, including ease of manufacturing, reduced cost, greater accuracy, etc. In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above may enable much more complex and intricate shapes and contours of the stiffener(s) 71 described herein. For example, such components may include thin additively manufactured layers and unique passageways, such as the internal cavity(ies) 104. In addition, the additive manufacturing process enables the manufacture of a single component having different materials such that different portions of the component may exhibit different performance characteristics, such as forming all or part of the stiffener(s) 71 form a SMA material. The successive, additive nature of the manufacturing process enables the construction of these novel features. As a result, the fan casing(s) 62 and/or stiffener(s) 71 described herein may exhibit improved performance and reliability.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A composite fan casing for a gas turbine engine comprising a plurality of fan blades, the gas turbine engine defining a central axis, the composite fan casing comprising:
   a core having a plurality of core layers of reinforcing fibers bonded together with a thermosetting polymeric resin and having an outer surface; and
   at least one stiffener that comprises an external structure that defines an internal cavity, wherein the external structure extends from a first axial location to a second axial location, the first axial location and the second axial location being aft of the plurality of fan blades of the gas turbine engine,
   wherein the external structure is integrally coupled to an aft portion of the outer surface of the core relative to the central axis at the first axial location and at the second axial location, wherein the aft portion of the outer surface of the core is aft of the plurality of fan blades of the gas turbine engine, wherein the internal cavity of the at least one stiffener comprises an elastic material, wherein the elastic material comprises a first layer of a shape memory alloy and a second layer of an elastomer or a rubber.

2. The composite fan casing of claim 1, wherein the elastic material comprises the shape memory alloy.

3. The composite fan casing of claim 2, wherein the shape memory alloy comprises at least one of nickel-titanium, a nickel-titanium based alloy, a copper-aluminum-nickel alloy, or an alloy containing zinc, copper, gold, or iron.

4. The composite fan casing of claim 1, wherein the elastic material comprises the elastomer or the rubber.

5. The composite fan casing of claim 1, wherein the elastic material comprises the shape memory alloy and the elastomer or the rubber.

6. The composite fan casing of claim 5, wherein the stiffener comprises one or more layers of the shape memory alloy arranged to alternate with one or more layers of the elastomer or the rubber.

7. The composite fan casing of claim 1, wherein the stiffener comprises an external hat-shaped structure that defines the internal cavity, the external hat-shaped structure comprising the first layer of the shape memory alloy and the second layer of the elastomer or the rubber, wherein the internal cavity comprises a third layer of the shape memory alloy, the elastomer, or the rubber.

8. The composite fan casing of claim 7, wherein the third layer comprises the shape memory alloy and the internal cavity further comprises a fourth layer of the elastomer or the rubber, wherein the first layer is adjacent to the second layer and the third layer is adjacent to the fourth layer.

9. The composite fan casing of claim 1, wherein the thermosetting polymeric resin comprises at least one of a vinyl ester resin, a polyester resin, an acrylic resin, an epoxy resin, or a polyurethane resin.

10. The composite fan casing of claim 1, wherein the reinforcing fibers comprise at least one of carbon fibers, graphite fibers, glass fibers, ceramic fibers, or aromatic polyamide fibers.

11. A composite fan casing for a gas turbine engine defining a central axis, the composite fan casing comprising:

a core having a plurality of core layers of reinforcing fibers bonded together with a thermosetting polymeric resin and having an outer surface; and at least one stiffener integrally coupled to an aft portion of the outer surface of the core relative to the central axis, wherein the at least one stiffener comprises an elastic material, wherein the elastic material comprises a shape memory alloy, wherein the stiffener comprises an external hat-shaped structure, wherein a mesh of the elastic material is housed within the external hat-shaped structure.

12. The composite fan casing of claim 11, wherein the shape memory alloy comprises at least one of nickel-titanium, a nickel-titanium based alloy, a copper-aluminum-nickel alloy, or an alloy containing zinc, copper, gold, or iron, wherein the thermosetting polymeric resin comprises at least one of a vinyl ester resin, a polyester resin, an acrylic resin, an epoxy resin, or a polyurethane resin.

13. The composite fan casing of claim 11, wherein the reinforcing fibers comprise at least one of carbon fibers, graphite fibers, glass fibers, ceramic fibers, or aromatic polyamide fibers.

14. A composite fan casing for a gas turbine engine defining a central axis, the composite fan casing comprising:

a core having a plurality of core layers of reinforcing fibers bonded together with a thermosetting polymeric resin and having an outer surface; and at least one stiffener integrally coupled to an aft portion of the outer surface of the core relative to the central axis, wherein the at least one stiffener comprises an elastic material, wherein the elastic material comprises a shape memory alloy, an elastomer, or a rubber, wherein the elastic material comprises the shape memory alloy and the elastomer or the rubber, wherein the stiffener comprises one or more layers of the shape memory alloy and one or more layers of the elastomer or the rubber, which define a lattice structure.

15. The composite fan casing of claim 14, wherein the shape memory alloy comprises at least one of nickel-titanium, a nickel-titanium based alloy, a copper-aluminum-nickel alloy, or an alloy containing zinc, copper, gold, or iron, wherein the thermosetting polymeric resin comprises at least one of a vinyl ester resin, a polyester resin, an acrylic resin, an epoxy resin, or a polyurethane resin.

16. The composite fan casing of claim 14, wherein the reinforcing fibers comprise at least one of carbon fibers, graphite fibers, glass fibers, ceramic fibers, or aromatic polyamide fibers.

17. A composite fan casing for a gas turbine engine defining a central axis, the composite fan casing comprising:

a core having a plurality of core layers of reinforcing fibers bonded together with a thermosetting polymeric resin and having an outer surface; and at least one stiffener integrally coupled to an aft portion of the outer surface of the core relative to the central axis, wherein the at least one stiffener comprises an elastic material, wherein the elastic material comprises a shape memory alloy, an elastomer, or a rubber, wherein the stiffener comprises an external hat-shaped structure that defines an internal cavity, the external hat-shaped structure comprising a first layer of the shape memory alloy and a second layer of the elastomer or the rubber, wherein the internal cavity comprises a third layer of the shape memory alloy, the elastomer, or the rubber.

18. The composite fan casing of claim 17, wherein the shape memory alloy comprises at least one of nickel-titanium, a nickel-titanium based alloy, a copper-aluminum-nickel alloy, or an alloy containing zinc, copper, gold, or iron.

19. The composite fan casing of claim 17, wherein the thermosetting polymeric resin comprises at least one of a vinyl ester resin, a polyester resin, an acrylic resin, an epoxy resin, or a polyurethane resin.

20. The composite fan casing of claim 17, wherein the reinforcing fibers comprise at least one of carbon fibers, graphite fibers, glass fibers, ceramic fibers, or aromatic polyamide fibers.

* * * * *